(12) United States Patent
Saraf et al.

(10) Patent No.: US 10,310,892 B1
(45) Date of Patent: Jun. 4, 2019

(54) APPARATUSES, SYSTEMS AND METHODS OF SWITCHING OPERATING SYSTEMS

(71) Applicant: BlueStack Systems, Inc., Campbell, CA (US)

(72) Inventors: Suman Saraf, Gurgaon (IN); Harvinder Singh Sawhney, Gurgaon (IN); Sharad Agrawal, Gurgaon (IN); Ambreesh Bangur, Gurgaon (IN); David P. Reese, Jr., Sunnyvale, CA (US)

(73) Assignee: Bluestack Systems, Inc., Campbell, CA (US)

( * ) Notice: Subject to any disclaimer, the term of this patent is extended or adjusted under 35 U.S.C. 154(b) by 0 days.

(21) Appl. No.: 14/638,709

(22) Filed: Mar. 4, 2015

Related U.S. Application Data

(62) Division of application No. 13/479,086, filed on May 23, 2012, now Pat. No. 10,089,093.
(Continued)

(51) Int. Cl.
*G06F 9/455* (2018.01)
*G06F 9/44* (2018.01)
(Continued)

(52) U.S. Cl.
CPC ........ *G06F 9/4843* (2013.01); *G06F 9/44505* (2013.01); *G06F 9/5055* (2013.01);
(Continued)

(58) Field of Classification Search
CPC .................. G06F 8/60; G06F 8/61; G06F 8/65
See application file for complete search history.

(56) References Cited

U.S. PATENT DOCUMENTS 7,210,121 B2 * 4/2007 Xia ........................ G06F 8/60
717/106
7,328,333 B2 2/2008 Kawano et al.
(Continued)

OTHER PUBLICATIONS

Eiraku et al., Fast networking with socket-outsourcing in hosted virtual machine environments, 8 pages (Year: 2009).*
(Continued)

*Primary Examiner* — Thuy Dao
(74) *Attorney, Agent, or Firm* — The Webb Law Firm

(57) ABSTRACT

Embodiments of the present invention are directed toward apparatuses, systems and methods of switching operating systems. The present invention includes a multi-OS runtime with virtualization technology, which allows applications developed for different operating systems to execute simultaneously, side-by-side, on the same computing device. The computing device typically includes a host operating system and at least one guest operating system. An application, which is disguised as a host operating system specific application on the host operating system, is configured to be installed and executed within the guest operating system. Host operating system based policies can be set for the application. The application can be launched from the host operating system, the guest operating system or both. The computing device allows for the ability to switch between different operating systems via a soft button, a hard button, or based on a configuration of the computing device, or a combination thereof.

18 Claims, 9 Drawing Sheets

Related U.S. Application Data

(60) Provisional application No. 61/489,611, filed on May 24, 2011.

(51) Int. Cl.
    *G06F 9/46*     (2006.01)
    *G06F 9/48*     (2006.01)
    *G06F 9/50*     (2006.01)
    *G06F 9/445*     (2018.01)
    *G06F 9/54*     (2006.01)

(52) U.S. Cl.
    CPC .......... *G06F 9/54* (2013.01); *G06F 2209/482* (2013.01); *G06F 2209/5016* (2013.01)

(56) References Cited

U.S. PATENT DOCUMENTS

| | | | |
|---|---|---|---|
| 7,647,491 B2* | 1/2010 | Kawano et al. .................. 713/1 |
| 7,987,432 B1 | 7/2011 | Grechishkin et al. |
| 7,987,459 B2 | 7/2011 | Chow et al. |
| 8,117,554 B1 | 2/2012 | Grechishkin et al. |
| 8,140,734 B2* | 3/2012 | Lou ............................ G06F 3/02 710/316 |
| 8,161,275 B1 | 4/2012 | Woodward |
| 8,196,120 B2* | 6/2012 | Irving ................. G06F 9/45504 703/26 |
| 8,239,667 B2 | 8/2012 | Durham |
| 8,255,201 B2* | 8/2012 | Wang .................. G06F 9/45537 703/23 |
| 8,301,864 B2* | 10/2012 | Wang .................. G06F 9/45504 711/205 |
| 8,332,936 B1 | 12/2012 | Hackborn et al. |
| 8,438,375 B1 | 5/2013 | Woodward |
| 8,448,160 B2 | 5/2013 | Vincent et al. |
| 8,453,149 B2* | 5/2013 | Ben Yehuda ....... G06F 9/45533 718/1 |
| 8,594,649 B2 | 11/2013 | Kwon et al. |
| 8,661,435 B2* | 2/2014 | Schroth ................. G06F 9/5033 718/1 |
| 8,726,263 B2 | 5/2014 | Rangarajan et al. |
| 8,732,697 B2 | 5/2014 | Jonnala et al. |
| 8,763,115 B2* | 6/2014 | Budko .................... G06F 21/53 726/22 |
| 8,782,258 B2 | 7/2014 | Brittain et al. |
| 8,819,202 B1 | 8/2014 | Carolan et al. |
| 8,868,899 B2 | 10/2014 | Galicia |
| 8,924,958 B1 | 12/2014 | Bangur et al. |
| 9,081,601 B2* | 7/2015 | Tang .................. G06F 9/45537 |
| 9,122,547 B1 | 9/2015 | Samuel |
| 9,176,721 B2 | 11/2015 | Mann |
| 9,348,633 B2 | 5/2016 | Galicia |
| 9,461,996 B2* | 10/2016 | Hayton ............... H04L 63/0815 |
| 9,618,216 B2 | 4/2017 | Kashihara et al. |
| 9,858,062 B2 | 1/2018 | Mann |
| 2004/0019601 A1 | 1/2004 | Gates |
| 2004/0088405 A1 | 5/2004 | Aggarwal |
| 2004/0158813 A1* | 8/2004 | Xia ............................ G06F 8/60 717/116 |
| 2005/0004992 A1 | 1/2005 | Horstmann et al. |
| 2005/0114870 A1 | 5/2005 | Song et al. |
| 2005/0198348 A1 | 9/2005 | Yeates |
| 2006/0010314 A1* | 1/2006 | Xu ................................. 713/2 |
| 2006/0010433 A1* | 1/2006 | Neil ............................ 717/138 |
| 2006/0212865 A1 | 9/2006 | Vincent et al. |
| 2008/0028400 A1 | 1/2008 | Taillefer et al. |
| 2008/0052776 A1* | 2/2008 | Prabhat et al. ................ 726/15 |
| 2008/0082815 A1 | 4/2008 | Kawano et al. |
| 2008/0083036 A1 | 4/2008 | Ozzie et al. |
| 2008/0133903 A1 | 6/2008 | Sun et al. |
| 2008/0141244 A1 | 6/2008 | Kelley |
| 2008/0216071 A1 | 9/2008 | Gidalov |
| 2009/0210702 A1 | 8/2009 | Welingkar et al. |
| 2009/0241104 A1 | 9/2009 | Amiga et al. |
| 2010/0010887 A1 | 1/2010 | Karlin |
| 2010/0063892 A1 | 3/2010 | Keronen |
| 2010/0146504 A1 | 6/2010 | Tang |
| 2010/0162233 A1 | 6/2010 | Ku et al. |
| 2010/0180273 A1* | 7/2010 | Harris ................. G06F 9/45533 718/1 |
| 2010/0199037 A1 | 8/2010 | Umbehocker et al. |
| 2010/0218184 A1 | 8/2010 | Minematsu et al. |
| 2011/0016299 A1 | 1/2011 | Galicia et al. |
| 2011/0035355 A1 | 2/2011 | Sagar et al. |
| 2011/0082900 A1 | 4/2011 | Nagpal et al. |
| 2011/0106880 A1 | 5/2011 | Strong et al. |
| 2011/0110315 A1 | 5/2011 | Chen et al. |
| 2011/0125593 A1 | 5/2011 | Wright |
| 2011/0126216 A1 | 5/2011 | Galicia et al. |
| 2011/0173602 A1 | 7/2011 | Togami et al. |
| 2011/0179253 A1* | 7/2011 | Yehuda .................. G06F 9/542 712/42 |
| 2011/0185292 A1 | 7/2011 | Chawla et al. |
| 2011/0185334 A1 | 7/2011 | Iyer et al. |
| 2011/0271088 A1* | 11/2011 | Princen et al. .................... 713/2 |
| 2011/0276621 A1 | 11/2011 | Edery et al. |
| 2011/0277027 A1* | 11/2011 | Hayton ............... H04L 63/0815 726/8 |
| 2011/0302630 A1 | 12/2011 | Nair et al. |
| 2011/0307354 A1 | 12/2011 | Erman |
| 2011/0314446 A1 | 12/2011 | Esbensen et al. |
| 2011/0314467 A1 | 12/2011 | Pearson |
| 2012/0005691 A1* | 1/2012 | Wong et al. .................. 719/319 |
| 2012/0011513 A1 | 1/2012 | McConaughy et al. |
| 2012/0011551 A1 | 1/2012 | Levy et al. |
| 2012/0023507 A1 | 1/2012 | Travis |
| 2012/0030584 A1 | 2/2012 | Bian |
| 2012/0042159 A1 | 2/2012 | Liu |
| 2012/0066675 A1 | 3/2012 | Shelansky et al. |
| 2012/0079095 A1 | 3/2012 | Evans et al. |
| 2012/0086716 A1 | 4/2012 | Reeves et al. |
| 2012/0089906 A1 | 4/2012 | Reeves et al. |
| 2012/0089992 A1 | 4/2012 | Reeves et al. |
| 2012/0110315 A1 | 5/2012 | Lee |
| 2012/0110496 A1 | 5/2012 | Lee et al. |
| 2012/0116905 A1 | 5/2012 | Futty et al. |
| 2012/0143900 A1 | 6/2012 | Ainslie et al. |
| 2012/0159144 A1* | 6/2012 | Sengupta et al. ............. 713/100 |
| 2012/0176746 A1 | 7/2012 | Chen et al. |
| 2012/0191961 A1 | 7/2012 | Wu et al. |
| 2012/0197968 A1 | 8/2012 | Korovin et al. |
| 2012/0206372 A1 | 8/2012 | Mundt et al. |
| 2012/0216181 A1 | 8/2012 | Arcese et al. |
| 2012/0272233 A1 | 10/2012 | Lee |
| 2012/0303476 A1 | 11/2012 | Krzyzanowski et al. |
| 2012/0324434 A1 | 12/2012 | Tewari et al. |
| 2013/0024778 A1 | 1/2013 | Reeves et al. |
| 2013/0047150 A1 | 2/2013 | Malasky et al. |
| 2013/0054952 A1 | 2/2013 | Shen |
| 2013/0074069 A1 | 3/2013 | Li |
| 2013/0081008 A1 | 3/2013 | Rangarajan et al. |
| 2013/0095785 A1 | 4/2013 | Sadana et al. |
| 2013/0139182 A1 | 5/2013 | Sethuraman et al. |
| 2013/0205294 A1 | 8/2013 | Mittal et al. |
| 2013/0268397 A1 | 10/2013 | Mehta et al. |
| 2014/0007084 A1 | 1/2014 | Ding |
| 2014/0007222 A1 | 1/2014 | Qureshi et al. |
| 2014/0040878 A1 | 2/2014 | Mann |
| 2014/0059536 A1 | 2/2014 | Hiratsuka et al. |
| 2014/0109072 A1 | 4/2014 | Lang et al. |
| 2015/0248281 A1 | 9/2015 | Zamir |
| 2015/0248282 A1 | 9/2015 | Zamir |
| 2015/0309811 A1 | 10/2015 | Wisgo |
| 2015/0326562 A1 | 11/2015 | Belote et al. |
| 2016/0378451 A1 | 12/2016 | Walker |
| 2016/0378878 A1 | 12/2016 | Gupta et al. |
| 2017/0039130 A1 | 2/2017 | Nandakumar et al. |
| 2017/0102976 A1 | 4/2017 | Nandakumar et al. |

OTHER PUBLICATIONS

Forrest et al., Virtualization and its effect on operating system, 11 pages (Year: 2011).*

(56) References Cited

OTHER PUBLICATIONS

Mark Wilson, 'Steam comes to Mac, Offers Cross-Platform Gaming Free of Charge', Mar. 8, 2010.

Ali et al., "Same App, Different App Stores: A Comparative Study", ACM, 2017, pp. 79-90, https://dl.acm.org/citation.cfm?id=3104099.

CITRIX, "Wrapping iOS mobile apps", Citrix Systems, 2018, pp. 1-13, https://docs.citrix.com/en-us/mdx-toolkit/1 0/xmob-mdx-kit-app-wrap-ios.html.

Ki et al., "Poster: Retro: An Automated, Application, Layer Record and Replay for Android", ACM, MobiSys'14, 2014, pp. 373, http://dl.acm.org/results.cfm?h=1&cfid=417717926&cftoken=68174932.

Liu et al., "ReWAP: Reducing Redundant Transfers for Mobile Web Browsing via App-Specific Resource Packaging", IEEE, 2017, pp. 2625-2638; https://ieeexplore.ieee.org/stamp/stamp.jsp?tp=&arnumber=7762888.

Perez, "How to Get Android Notifications on Your Computer Desktop (Mac, Linux or Windows)", 2010, www.readwrite.com, pp. 1-5.

Rapidvalue, "How to Choose the Right Architecture for Your Mobile Application", RapidValue Solutions, 2012, pp. 1-16, http://www.rapidvaluesolutions.com/wp-content/uploads/2013/04/How-to-Choose-the-Right-Technology-Architecture-for-Your-Mobile-Application.pdf.

Wu et al., "Scaling Social Media Applications Into Geo-Distributed Clouds", IEEE, 2014, pp. 1-14, http://ieeexplore.ieee.org/stamp/stamp.jsp?tp=&arnumber=6766261.

\* cited by examiner

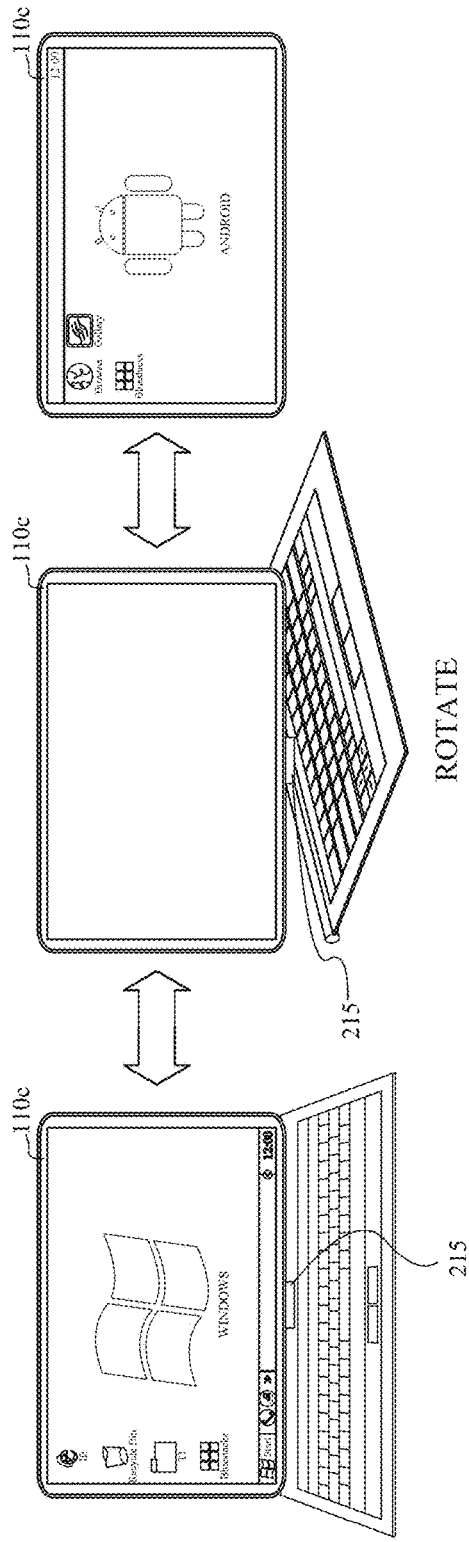
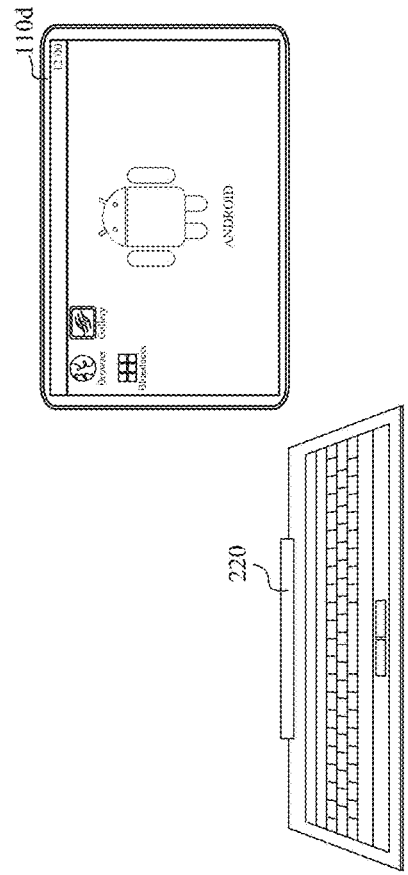
Fig. 2C ROTATE
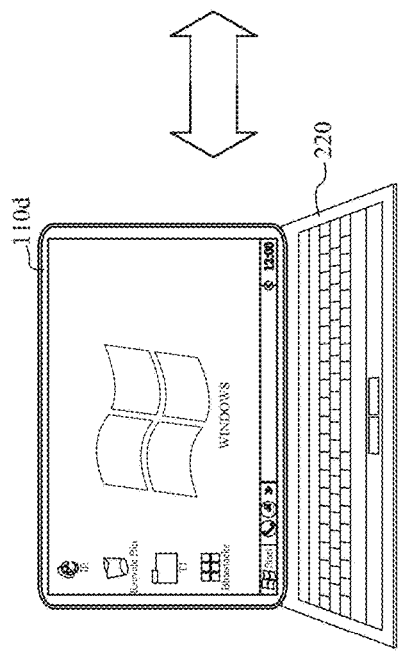
Fig. 2D DOCKING

SLIDE OUT

APPARATUSES, SYSTEMS AND METHODS OF SWITCHING OPERATING SYSTEMS

RELATED APPLICATIONS

This application is a divisional of co-pending U.S. patent application Ser. No. 13/479,056, filed May 23, 2012, entitled "APPARATUSES, SYSTEMS AND METHODS OF SWITCHING OPERATING SYSTEMS," which claims benefit of priority under 35 U.S.C. section 119(e) of the U.S. Provisional Patent Application Ser. No. 61/489,611 filed May 24, 2011, entitled "Switch Operating Systems," both of which are hereby incorporated by reference in their entirety.

FIELD OF THE INVENTION

The present invention is related to the field of operating systems. More specifically, the present invention relates to apparatuses, systems and methods of switching operating systems.

BACKGROUND OF THE INVENTION

A computing device is typically controlled by an operating system, such as Microsoft Windows®. As more and more computing devices become prevalent, so are the operating systems (OS) that control these computing devices. Examples of an operating system include, but are not limited to, UNIX®, Mac® OS X, Linux®, Android®, BlackBerry® OS, iOS®, Symbian® OS and MeeGo®. Applications to be installed on these computing devices are typically operating system-specific. That is, an application specifically for the Android operating system can only be installed and executed on a computing device running the Android operating system. The Android® specific application will fail to install and execute on a computing device running a different operating system, for example, iOS®. Although various versions of an application may be available for different operating systems, this is not necessarily true for all applications. Furthermore, there may be times when a user is only able to access an application that is specific to an operating system that is different from the operating system running on the user's device.

The present invention addresses at least these limitations in the prior art.

SUMMARY OF THE INVENTION

Embodiments of the present invention are directed toward apparatuses, systems and methods of switching operating systems. The present invention includes a multi-OS runtime with virtualization technology, which allows applications developed for different operating systems to execute simultaneously, side-by-side, on the same computing device. The computing device typically includes a host operating system and at least one guest operating system. An application, which is disguised as a host operating system specific application on the host operating system, is configured to be installed and executed within the guest operating system. Host operating system based policies can be set for the application. The application can be launched from the host operating system, the guest operating system or both. The computing device allows for the ability to switch between different operating systems via a soft button, a hard button, or based on a configuration of the computing device, or a combination thereof.

In one aspect, a non-transitory computer-readable medium stores instructions that, when executed by a computing device, cause the computing device to perform a method. The method includes receiving a command to switch between at least two operating systems, and switching between any two operating systems based on the command. The at least two operating systems typically include a host operating system and a guest operating system. The host operating system can be the same as or different from the guest operating system.

In some embodiments, the command is provided via a soft key, a hard key or both. Alternatively or in addition to, the command is determined based on a configuration of the computing device.

The method also includes opening the guest operating system in an overlay. A guest operating system specific application is configured to be launched in the overlay. In some embodiments, the guest operating system specific application is activated from the guest operating system. Alternatively or in addition to, the guest operating system specific application is activated from the host operating system; the guest operating system specific application is disguised as a host operating system specific application in the host operating system. The guest operating system specific application can be activated from a folder within the host operating system, from a desktop area of the host operating system, or both.

In some embodiments, the method also includes launching the guest operating system specific application in the overlay. In some embodiments, the method also includes displaying a listing of any guest operating system specific applications in the overlay. Access restrictions using host operating system mechanisms can be applied on any guest operating system specific application.

In some embodiments, the method also includes assigning the host operating system to a processor and the guest operating system to another processor.

In another aspect, a non-transitory computer-readable medium stores instructions that, when executed by a computing device, cause the computing device to perform a method. The method includes receiving a command to execute a program from a first operating system, and executing the program in a second operating system. The computing system supports the second operating system and the first operating system.

In some embodiments, the program is disguised as a first operating system specific application in the first operating system. First operating system based policies can be set on the program. First operating system based policies are enforced on the program when the program is executing in the second operating system.

The program is removable from the first operating system. In some embodiments, removing the program in the first operating system thereby removes the program in the second operating system.

In some embodiments, the method also includes downloading and installing an application player associated with the second operating system on the computing device.

In some embodiments, the method also includes assigning a processor to the first operating system and another processor to the second operating system.

In yet another aspect, a computing device includes at least two operating systems and a switching mechanism configured to switch between any of the at least two operating systems. The at least two operating system typically includes a first operating system and a second operating system. In some embodiments, the first operating system is a host operating system of the computing device, and the second operating system is a guest operating system.

The switching mechanism includes a hard key on the computing device. Alternatively or in addition to, the switching mechanism includes a soft key. Alternatively or in addition to, the switching mechanism is dependent on a plurality of configurations of the computing device. In some embodiments, the computing device in a first configuration is predisposed to the first operating system, and the computing device in a second configuration is predisposed to the second operating system. For example, the first configuration is when the computing device is docked to a docking station, and the second configuration is when the computing device is undocked from the docking station. For another example, the first configuration is when the computing device is rotated to a laptop form, and the second configuration is when the computing device is rotated to a tablet form. For yet another example, the first configuration is when a screen does not obscure a keyboard, and the second configuration is when the screen obscures the keyboard.

In yet another aspect, a system includes a docking station, a computing device configured to couple with the docking station, and a display communicatively coupled with the docking station. The computing device includes at least two operating systems, including a first operating system and a second operating system. The computing device also includes a screen. The screen is configured to show content associated with one of the at least two operating systems when the computing device is docked to the docking station. The display is configured to show content associated with another of the at least two operating systems when the computing device is docked to the docking station.

In some embodiments, the computing device further includes a switching mechanism configured to switch between any of the at least two operating systems. In some embodiments, the computing device further includes an application. The application is disguised as a first operating system specific application on the first operating system and configured to be installed in the second operating system. In some embodiments, the first operating system is running on one processor, while the second operating system is running on another processor.

In yet another aspect, a non-transitory computer-readable medium storing instructions that, when executed by a computing device, cause the computing device to perform a method. The method includes obtaining a guest operating system specific application, and wrapping the guest operating system specific application with a host operating system specific file, thereby creating a disguised file. In some embodiments, the disguised file appears as a native application to a host operating system. In some embodiments, the disguised file is activated from the host operating system to be executed within a guest operating system.

In yet another aspect, a non-transitory computer-readable medium storing instructions that, when executed by a computing device, cause the computing device to perform a method. The method includes activating a disguised application from a host operating system, stripping a wrapping around the disguised application, thereby creating a stripped application, and installing the stripped application in a guest operating system. In some embodiments, the method further includes placing a proxy application on the host operating system. In some embodiments, the method further includes executing the stripped application in the guest operating system. In some embodiments, the disguised file appears as a native application to the host operating system.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

FIGS. 2A-2E illustrate exemplary switching mechanisms in accordance with the present invention.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed toward apparatuses, systems and methods of switching operating systems. The present invention includes a multi-OS runtime with virtualization technology, which allows applications developed for different operating systems to execute simultaneously, side-by-side, on the same computing device. The computing device typically includes a host operating system and at least one guest operating system. An application, which is disguised as a host operating system specific application on the host operating system, is configured to be installed and executed within the guest operating system. Host operating system based policies can be set for the application. The application can be launched from the host operating system, the guest operating system or both. The computing device allows for the ability to switch between different operating systems via a soft button, a hard button, or based on a configuration of the computing device, or a combination thereof.

Figure 1:
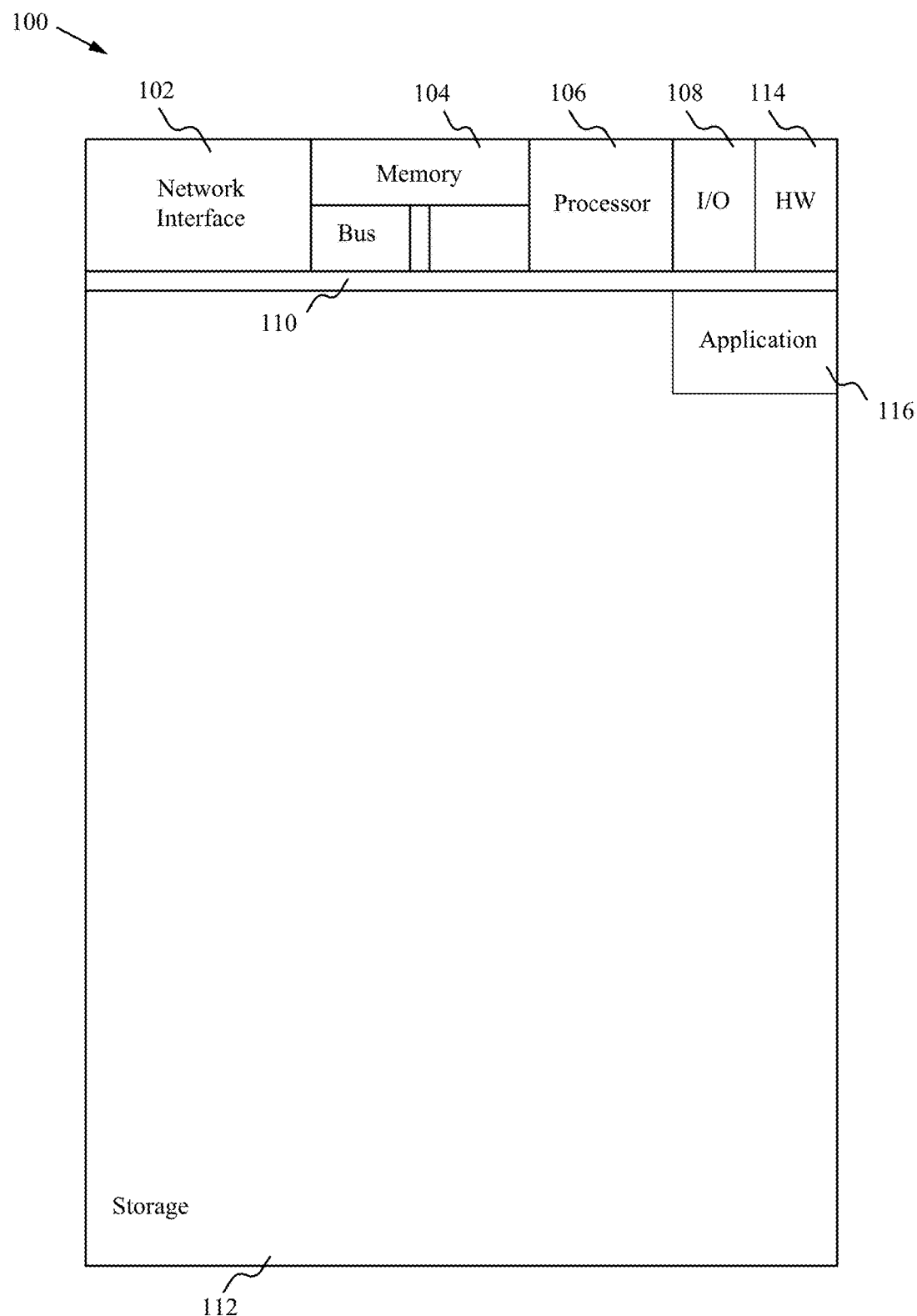
FIG. 1 illustrates a block diagram of an exemplary computing device in accordance with the present invention.

FIG. 1 illustrates a block diagram of an exemplary computing device 100 in accordance with the present invention. The computing device 100 is able to be used to acquire, cache, store, compute, search, transfer, communicate and/or display information. For example, the computing device 100 is able to execute procedures to switch operating systems. For another example, the computer device 100 is able to execute operating system specific applications.

In general, a hardware structure suitable for implementing the computing device 100 includes a network interface 102, a memory 104, processor(s) 106, I/O device(s) 108, a bus 110 and a storage device 112. The choice of processor is not critical as long as a suitable processor with sufficient speed is chosen. In some embodiments, the computing device 100 includes a plurality of processors 106. The memory 104 is able to be any conventional computer memory known in the art. The storage device 112 is able to include a hard drive, CDROM, CDRW, DVD, DVDRW, flash memory card, RAM, ROM, EPROM, EEPROM or any other storage device. The computing device 100 is able to include one or more network interfaces 102. An example of a network interface includes a network card connected to an Ethernet or other type of LAN. The I/O device(s) 108 are able to include one or more of the following: keyboard, mouse, monitor, display, printer, modem, touchscreen, button interface and other devices. Application(s) 116, including an application player and guest operating system specific applications, are likely to be stored in the storage device 112 and memory 104 and are processed by the processor 106. More or less components shown in FIG. 1 are able to be included in the computing device 100. In some embodiments, hardware 114 for switching operating systems is included. Although the computing device 100 in FIG. 1 includes applications 116 and hardware 114 for switching operating systems, this procedure is able to be implemented on a computing device in hardware, firmware, software or any combination thereof.

Switching Operating Systems

A computing device, such as the one illustrated in FIG. 1, supports a plurality of operating systems and allows for the ability to switch between different operating systems via a soft button, a hard button, or based on a configuration of the computing device, or a combination thereof. FIGS. 2A-2E illustrate exemplary switching mechanisms in accordance with the present invention. A single or multiple switching mechanisms can be implemented on the computing device 100. Typically, the plurality of operating systems includes a host operating system and at least one guest operating system. The host operating system can be the same as or different from each guest operating system. For illustration purposes, assume that the host operating system is Windows 7® and that a guest operating system is Android®.

Figure 2A:
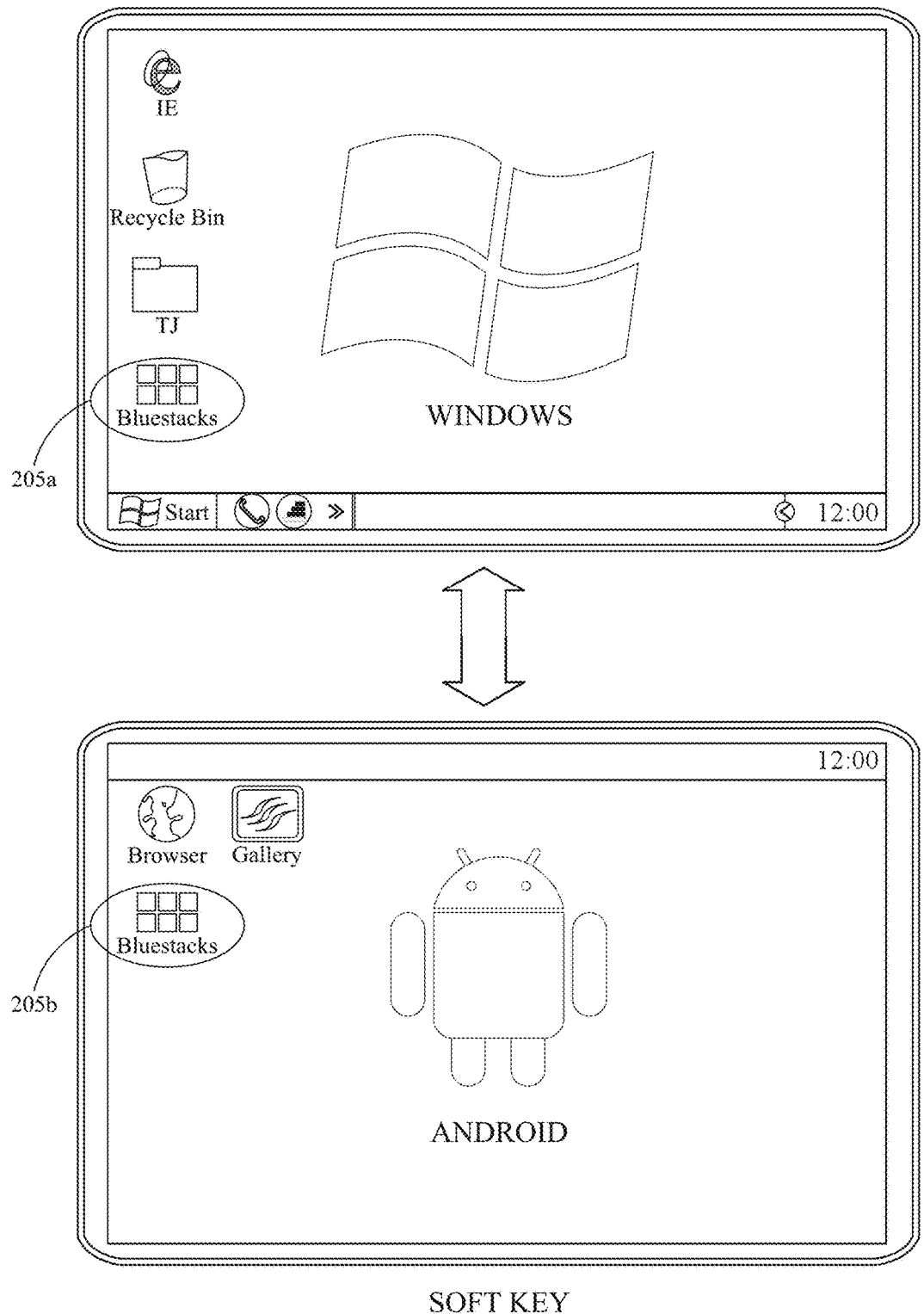

FIG. 2A illustrates a switching mechanism that is implemented as a soft key, such as an icon. In FIG. 2A, an icon 205a is shown as residing on a desktop of the host Windows 7® operating system, although the icon 205a can reside elsewhere within the host Windows 7® operating system. The icon 205a, when activated, is configured to send a command to switch from the host Windows 7® operating system to another operating system. In this example, based on the command, the computing device switches to the guest Android® operating system. Similarly, an icon 205b is shown as residing on a desktop of the guest Android® operating system, although the icon 205b can reside elsewhere within the guest Android® operating system. The icon 205b, when activated, is configured to send a command to switch from the guest Android® operating system to another operating system. In this example, based on the command, the computing device switches back to the host Windows 7® operating system. The soft key 205 allows the user to manually switch between operating systems.

Figure 2B:
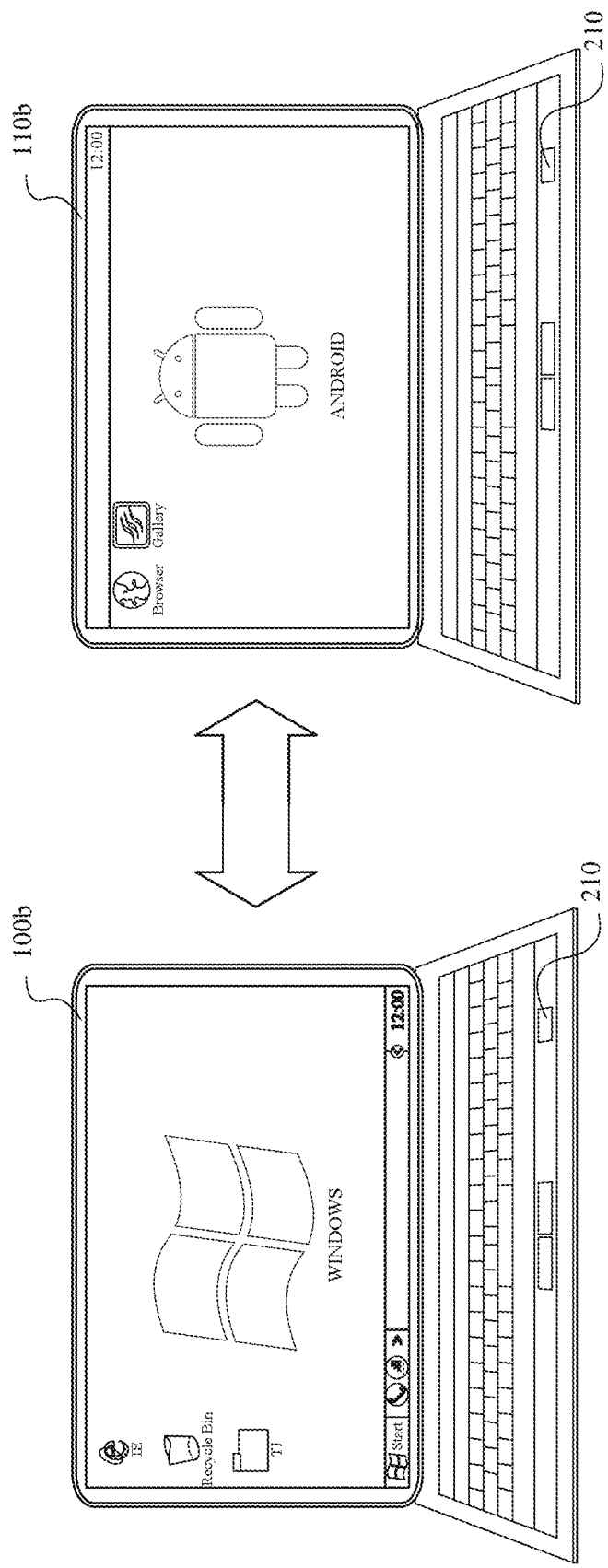

FIG. 2B illustrates a switching mechanism that is implemented as a hard key on a computing device 100b. The hard key 210 can be an additional button or can replace an existing button on a keyboard. Alternatively, the hard key 210 can be a lever, a handle, a slide or any suitable hardware mechanism that the user can manually activate. In FIG. 2B, the hard key 210 is shown as an additional button. The button 210, when activated, is configured to send a command to switch from the host Windows 7® operating system to another operating system. In this example, based on the command, the computing device 100b switches to the guest Android® operating system. Similarly, when the button 210 is activated again, a command is sent to switch from the guest Android® operating system to another operating system. In this example, based on the command, the computing device 100b switches back to the host Windows 7® operating system. Similar to soft key 205, the hard key 210 allows the user to manually switch between operating systems.

Figure 2E:
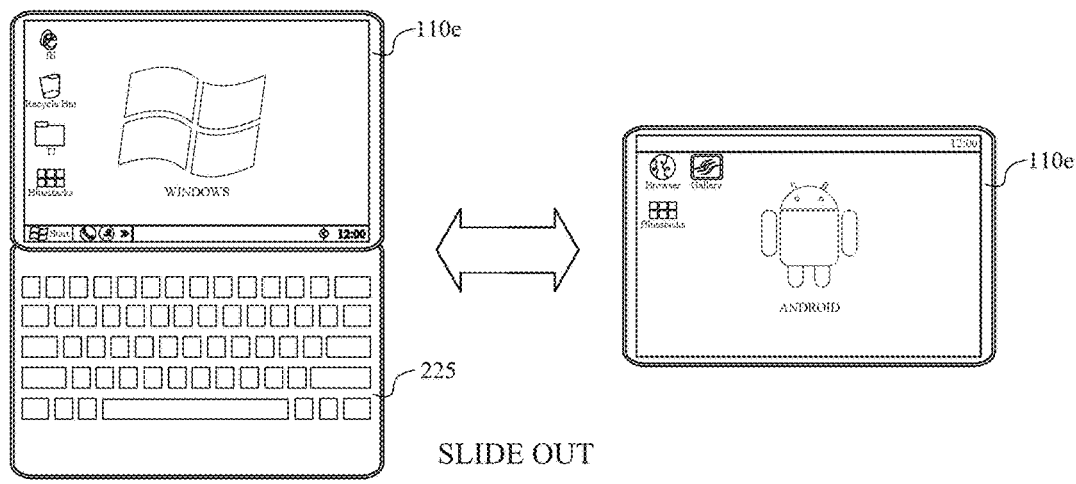

While FIGS. 2A-2B illustrate switching mechanisms that require user intervention (e.g., manual switching via soft key and/or hard key), FIGS. 2C-2E illustrate switching mechanisms that do not require user intervention. Rather, switching between operating systems is automatic and is based on the modality of the computing device. Put differently, the switching mechanisms are dependent on the physical configuration or geometry of the computing device. In some embodiments, when the computing device is in a first configuration, the computing device is predisposed to one operating system, such as the host Windows 7® operating system, and when the computing device is in a second configuration, the computing device is predisposed to another operating system, such as the guest Android® operating system. In some embodiments, when a keyboard of the computing device is not obscured by a screen, the computing device is predisposed to one operating system, such as the host Windows 7® operating system, and when the keyboard of the computing device is obscured by a screen, the computing device is predisposed to another operating system, such as the guest Android® operating system. Furthermore, in some embodiments, within the same configuration, the user is able to manually switch to another operating system via a soft key (FIG. 2A) and/or a hard key (FIG. 2B).

For example, as illustrated in FIG. 2C, when a computing device 110c is rotated into a laptop form via a rotating mechanism 215, the computing device 110c is predisposed to an operating system, such as the host Windows 7® operating system. When the computing device 110c is rotated into a tablet form via the rotating mechanism 215, the computing device 110c is predisposed to another operating system, such as the guest Android® operating system. Switching between the two operating systems is automatic and is based on the physical configuration of the computing device 110c. An example of the computing device 110c is Lenovo® S10-3T.

For another example, as illustrated in FIG. 2D, when a computing device 110d is docked to a docking station 220, the computing device 110d is predisposed to an operating system, such as the host Windows 7® operating system. When the computing device 110d is undocked from the docking station 220, the computing device 110d is predisposed to another operating system, such as the guest Android® operating system. Switching between the two operating systems is automatic and is based on the physical configuration of the computing device 110d. An example of the computing device 110d is Acer Iconia®.

For yet another example, as illustrated in FIG. 2E, when a computing device 110e is "open" via a sliding mechanism 225, the computing device 110e is predisposed to an operating system, such as the host Windows 7® operating system. When the computing device 110e is "closed," obscuring the keyboard, the computing device 110e is predisposed to another operating system, such as the guest Android® operating system. Switching between the two operating systems is automatic and is based on the physical configuration of the computing device 110e.

In some embodiments, switching between operating systems can be based on a specific gesture. For example, the user can draw an "A" for Android® or a "W" for Windows 7® on a touch screen or a mouse/track pad of the computing device. For another example, the user can draw an "A" or a "W" in space that is captured by a camera coupled to the computing device. Other gestures, such as a flick or a swipe, with single or multi-touch variants, are also contemplated.

Although toggling between the host Windows 7® operating system and the guest Android® operating system has been described, toggling between the host Windows 7® operating system and a guest Android® operating system specific application is contemplated and similarly configured. Furthermore, toggling between an $x^{th}$ guest operating system and a $y^{th}$ guest operating system or a $y^{th}$ guest operating system specific application is also contemplated and similarly configured. In addition, although FIGS. 2A-2E illustrate the guest Android® operating system in a full screen mode, the guest Android® operating system can also be displayed in an overlay in the host environment.

Figure 3:
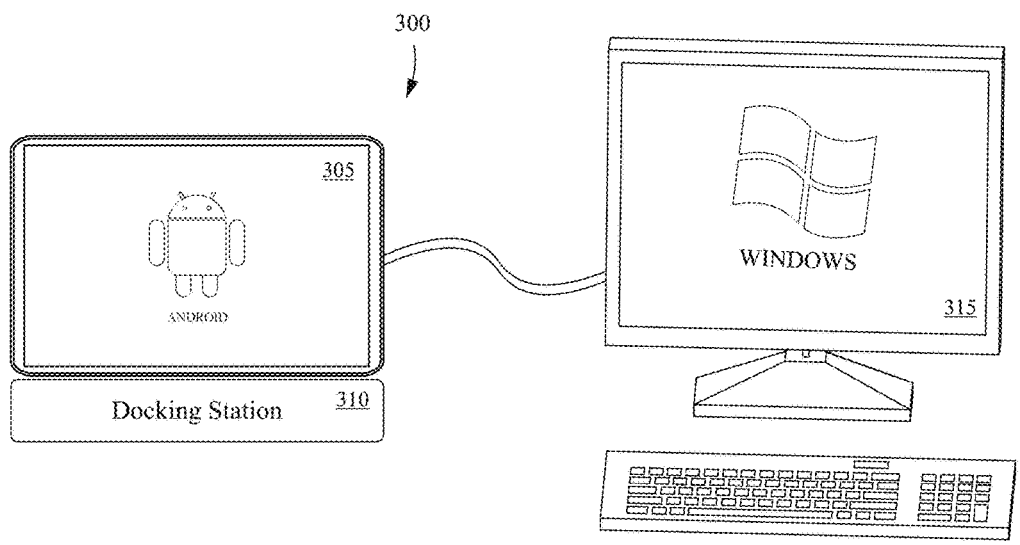
FIG. 3 illustrates an exemplary system in accordance with the present invention.

FIG. 3 illustrates an exemplary system 300 in accordance with the present invention. The system 300 includes a computing device 305, a docking station 310 and a display 315 that is communicatively coupled with the docking station 310, the computing device 305 or both.

The computing device 305 is similarly configured as the computing device 100, and includes a plurality of operating systems and at least one switching mechanism configured to switch between any of the plurality of operating systems. The operating systems typically includes a host operating system and a guest operating system. The computing device 305 is configured to communicatively couple with the docking station 310. When the computing device 305 is communicatively coupled with the docking station 310, then the screen of the computing device 305 shows content associated with one of the plurality of operating systems, while the display 315 shows content associated with another of the plurality of operating systems. In FIG. 3, the Android® operating system is displayed on the screen of the computing device 300, and the Windows 7® operating system is displayed on the display 315.

The display 315 can be either physically or wirelessly coupled with the computing device 305, the docking station 310 or both. The display 315 can be a television, a display panel, or any suitable viewing device.

In some embodiments, the user is able to select which operating system is to be displayed on the computing device 305, on the display 315, or both. Alternatively or in addition to, such selection is automatically determined and performed upon communicatively coupling the computing device 305 to the docking station 310.

Figure 4:
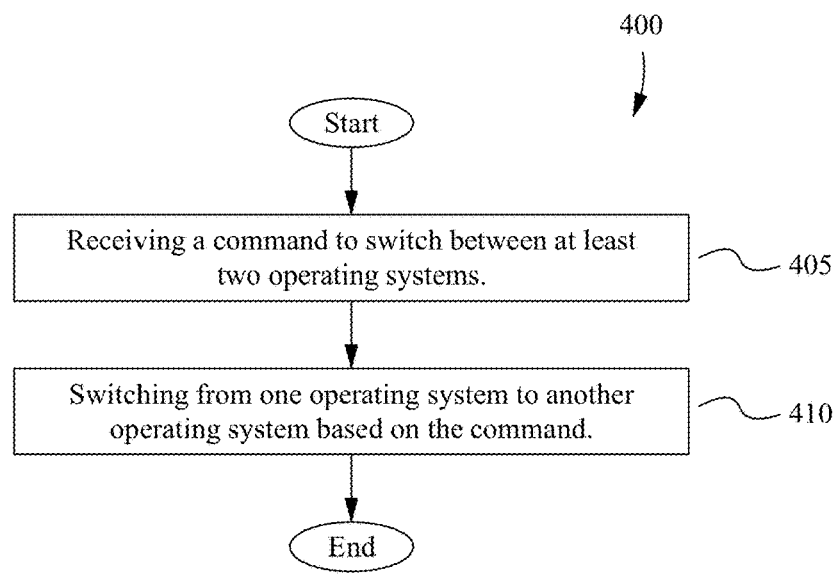
FIG. 4 illustrates an exemplary switching method in accordance with the present invention.

FIG. 4 illustrates an exemplary switching method 400 in accordance with the present invention. The method 400 starts at a step 405, where a command is received to switch from a first operating system to a second operating system. The command is provided via a soft key, a hard key, or is determined based on a configuration of a computing device. The first and second operating systems can be the same or different. For example, the first operating system is the host Windows 7® operating system and the second operating system is the guest Android® operating system. At a step 410, the computing device switches from the first operating system to the second operating system based on the command. After the step 410, the method 400 ends.

Typically, the user is able to switch between operating systems any number of times during use of the computing device either by changing physical configuration of the computing device, or by activating a soft key or a hard key.

When a virtual machine is closed or suspended, the state of the guest operating system in the virtual environment is typically saved. In some embodiments, the guest operating system flushes all its buffers and unused memory. The guest operating system also kills any user processes. The guest operating system then saves the state. These steps performed by the guest operating system advantageously reduce time to save and restore the state.

Pinning

Figure 5:
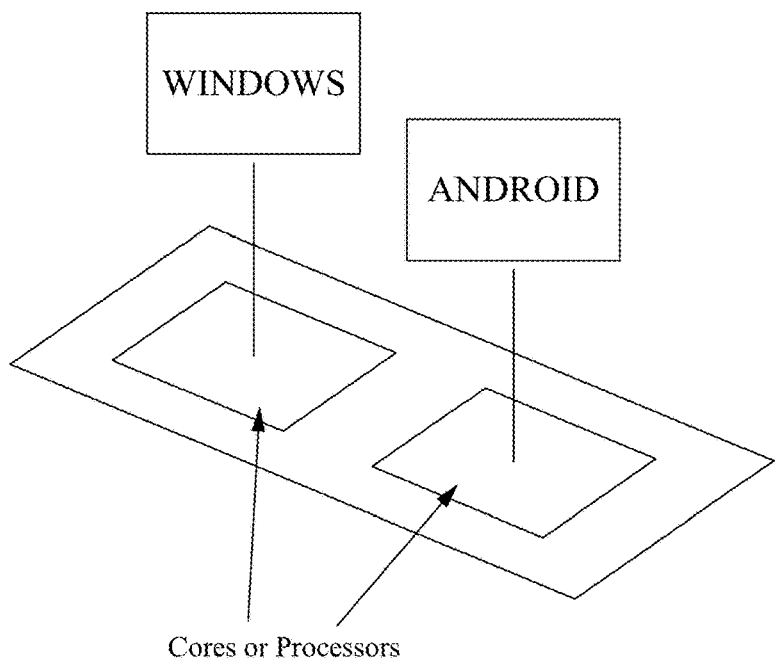
FIG. 5 illustrates an exemplary pinning in accordance with the present invention.

In some embodiments, if a computing device includes multiple processors or cores, each operating system is pinned to one of the processors or cores, as illustrated in FIG. 5, which advantageously simplifies resource sharing between the operating systems. Continuing with the example, if the computing device has two processors, the host Windows 7® operating system can be pinned to one processor and the guest Android® operating system can be pinned to another processor. In another example, if the computing device has two processors and is supporting three operating systems (one host operating system and two guest operating systems), then one processor can be assigned to the host operating system, while another processor can be assigned to the two guest operating systems.

Pinning can be arbitrary or calculated based on, for example, characteristics of the processors or cores. Pinning is used with a Type 1 hypervisor, a Type 2 hypervisor or with a hypervisor but with the help of other operating systems. In some embodiments, the pinning or assignment is done when a guest operating system is invoked. In some embodiments, the operating systems can be reassigned to different processors or cores after the initial pinning.

Operating System Specific Applications

Icons for applications, folders and files (collectively referred to as applications) specific to one operating system, e.g., a host operating system, can be displayed along with icons for applications specific to other operating system(s), e.g., guest operating system(s). Typically, for each guest operating system specific application, there is a corresponding proxy application in the host operating system.

The phrase "proxy application" can refer to a disguised application or a shortcut or other means to execute an installed guest operating specific application from the host operating system. It should be clear from the context which of the two uses "proxy application" is referring to.

Figure 6A:
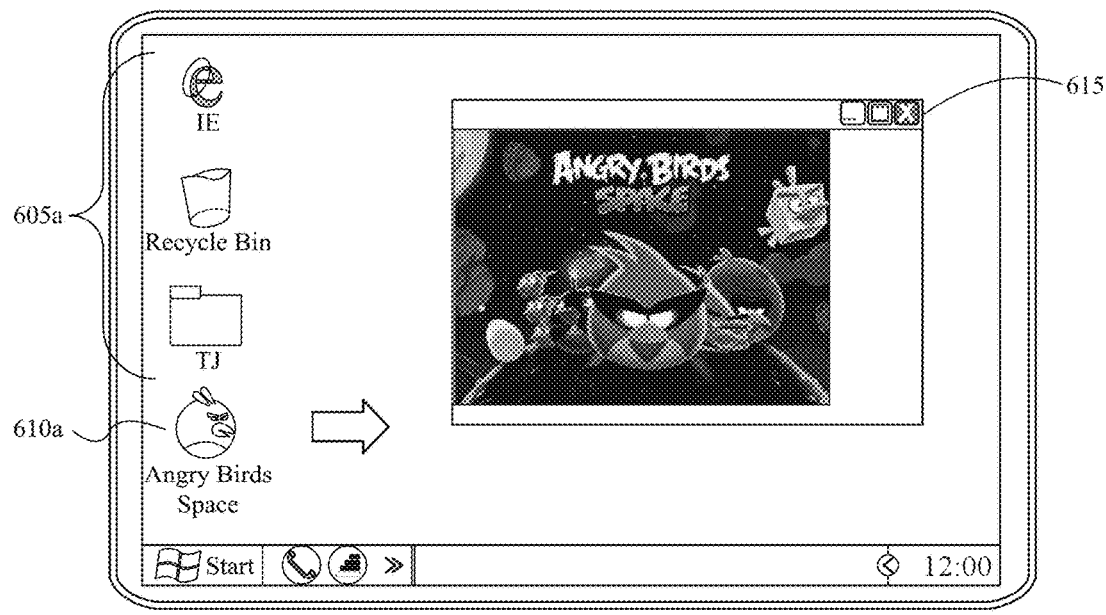
FIGS. 6A-6B illustrate exemplary desktops in accordance with the present invention.

For example, FIG. 6A illustrates Windows 7® as the host operating system and Android® as the guest operating system. In FIG. 6A, icons 605a for Windows 7® applications, e.g., Internet Explorer, Recycle Bin and a folder named TJ, are displayed along with an icon 610a for Angry Birds®, which is a "proxy" Windows® application.

Figure 6B:
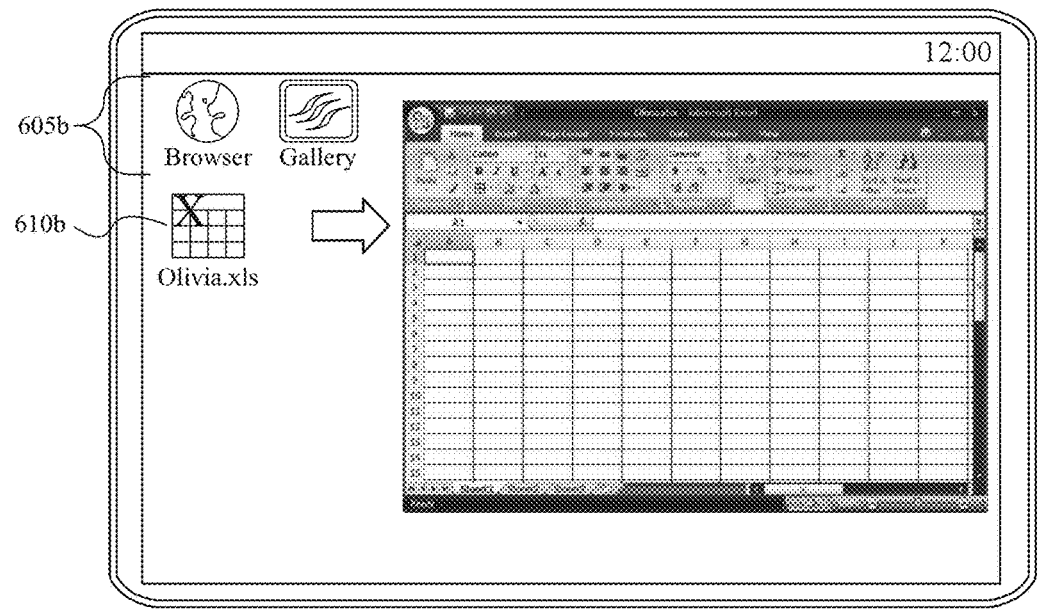

For another example, FIG. 6B illustrates Android® as the host operating system and Windows 7® as the guest operating system. In FIG. 6B, icons 605b for Android® applications, e.g., Browser and Gallery, are displayed along with an icon 610b for the Excel file named Olivia.xls, which is a "proxy" Android® application.

Each icon 605a, 605b is able to link to one or more proxy applications. When an icon 605a, 605b is activated, one or more corresponding applications are launched in the guest environment. A proxy application typically looks and appears to the host operating system just like a native application (e.g., a host operating system application). For example, referring back to FIG. 6A, the proxy Angry Birds® application appears to Windows 7® just like a Windows 7® application; however, it is configured to launched in the guest environment 615.

Although a proxy application is typically packaged in such a way that it appears as a native application to the host operating system, it is installed and executed in the guest operating system. Continuing with the example, the proxy Angry Birds® application is installed via a MSI package or an EXE. In one embodiment, the proxy Angry Birds® application is an Android® application package (APK) file wrapped with an EXE file. The proxy Angry Birds® application is thus disguised as a Windows 7® application in the host Windows® operating system. During installation of Angry Birds®, the proxy Angry Birds® is stripped of the EXE wrapping and is installed in the guest Android® operating system. After installation, Angry Birds® shows up in the installed programs list of the host Windows 7® operating system. When Angry Birds® is activated from the host Windows 7® operating system, it is executed in the guest Android® operating system. This installation process allows guest operating system specific applications to be distributed and managed using software currently used for managing and distributing Windows® applications, such as system center, HP Radia®, and Citrix® Receiver.

Figure 9:
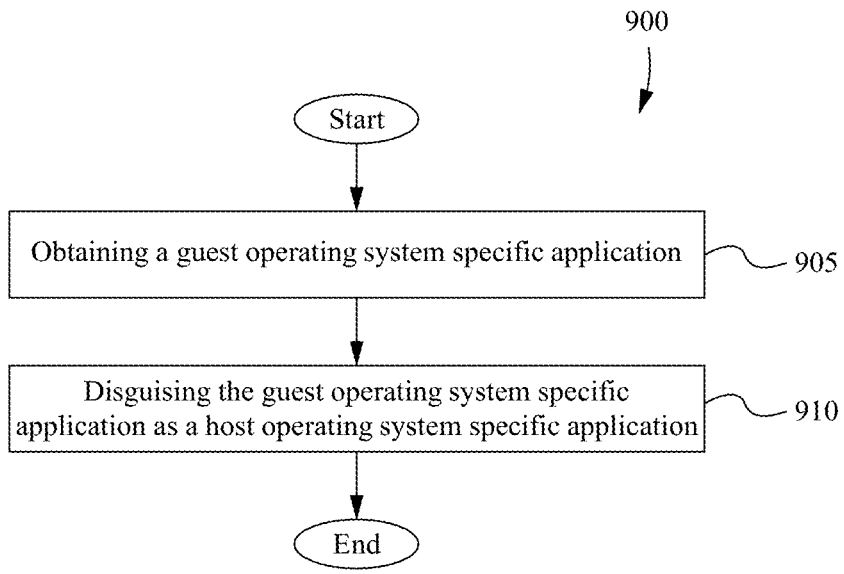
FIG. 9 illustrates an exemplary method of masking a guest operating system specific application in accordance with the present invention.

FIG. 9 illustrates an exemplary method 900 of masking a guest operating system specific application in accordance with the present invention. The method 900 begins at a step 905, where a guest operating system specific application is obtained. Continuing with the example, the guest operating system specific application is an APK file, such as Angry Birds®. At a step 910, the guest operating system specific application is disguised as a host operating system specific application. In this example, Angry Birds® is disguised as a host Windows 7® operating system specific application by wrapping the APK file with an EXE file. After the step 910, the method 900 ends. The disguised file can be downloaded, prebundled with, or otherwise transferred onto a user device. To the host Windows 7® operating system, the disguised file typically looks like a native Windows 7® application.

Figure 10:
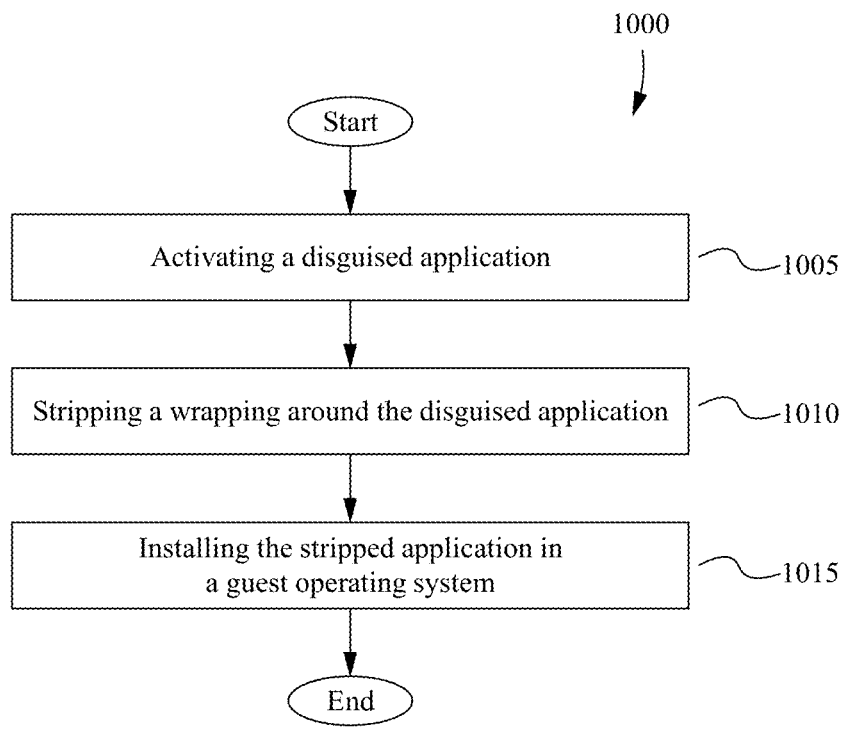
FIG. 10 illustrates an exemplary method of unmasking a disguised file in accordance with the present invention.

Assuming that the disguised file is on the user device, FIG. 10 illustrates an exemplary method 1000 of unmasking disguised file in accordance with the present invention. As discussed above, a disguised file is a proxy application on the host operating system. The method 1000 begins at a step 1005, where the disguised file is activated from the host operating system. For example, Angry Birds® is activated from the Windows 7® environment. At a step 1010, the a wrapping around the disguised file is stripped. In this example, the EXE file is stripped, revealing an APK file. At a step 1015, the guest operating system specific application is installed in a guest operating system. Continuing with the example, the APK file is installed in the guest Android® operating system. After the step 1015, the method 1000 ends. It should be noted that the steps 1010 and 1015 are skipped if the application had previously been installed in the guest operating system. The stripped application for Angry Birds® is typically executed within the guest Android® operating system after the installation.

In some embodiments, at least one proxy application, such as a shortcut or any means to start Angry Birds®, is placed on the host Windows® operating system after installation. A proxy application allows Angry Birds® to be started within the guest Android® operating system at any time after the installation.

In some embodiments, when Angry Birds® is removed, for example via the Add/Remove Programs feature from the host Windows 7® operating system, both the proxy application from the host operating system and the application from the guest operating system are removed. Alternatively, only the proxy application from the host operating system is removed without affecting the installation of the application in the guest operating system.

Host operating system policies or rules can be applied to any proxy application. Continuing with the example, Window 7 based policies or rules can be set for Angry Birds®. Exemplary policies or rules are one set in Active Directory, group policies, security policies set by A/V programs or firewall rules. These policies or rules can be local or administered via a remote management console or machine. Typically, these policies or rules are enforced when an application corresponding to the proxy is launched in its respective guest environment (e.g., guest Android® operating system).

Guest operating system specific applications can be stored in one or more different directories in the host operating system. Furthermore, different permissions and access rules can be applied to the guest operating system specific applications. In some embodiments, data shared between the host operating system and the guest operating system can be configured on an application by application basis. In some embodiments, data that is completely within the guest operating system can also be configured on an application by application basis. For example, trusted applications can access to c:\user\bstks\Desktop or Documents, etc., while non-trusted application can access only their folders.

Now assume the user has already downloaded or otherwise received a guest operating system specific program on a computing device, and the computing device only thus far supports a host operating system. The guest operating system specific program can be a game, a kids application, a photo application, a social application, a music application, a news application, a messaging application or any other application.

Figure 7:
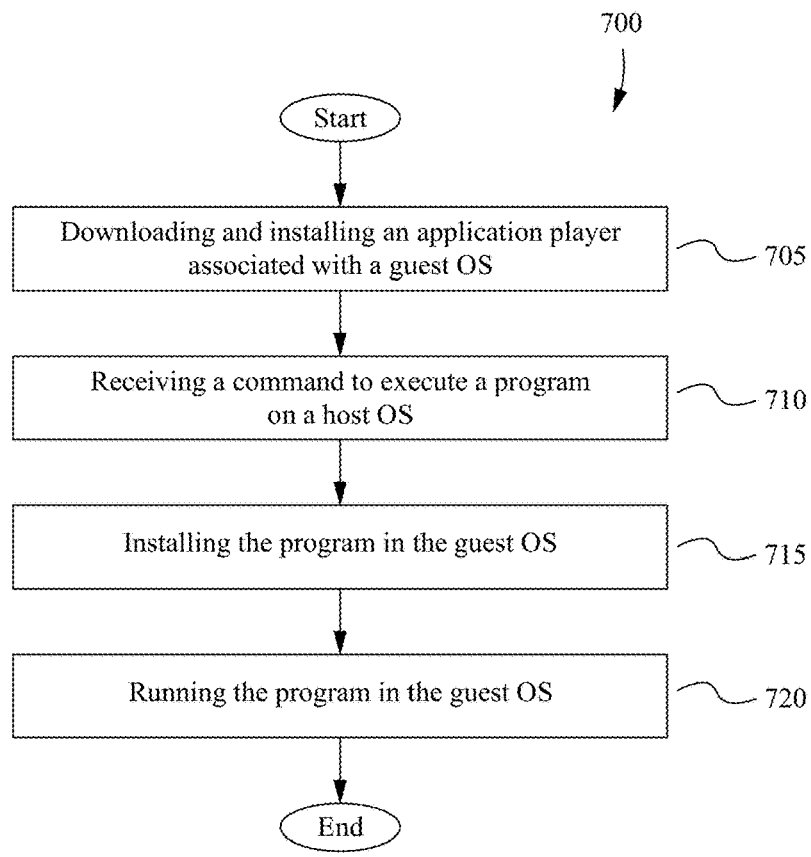
FIG. 7 illustrates an exemplary method of running a guest operating system specific program in accordance with the present invention.

FIG. 7 illustrates an exemplary method 700 of running a guest operating system specific program in accordance with the present invention. The method 700 begins at a step 705, where an application player is downloaded and installed on the computing device. The application player is associated with a guest operating system that allows guest operating system specific programs to execute within that guest environment. In some embodiments, the application player is configured to open the guest operating system in an overlay. An overlay can be a window, a browser, a player or the like. Alternatively, the guest operating system can be opened in a full screen mode. The step 705 is typically skipped if the application player is already installed on the computing device.

In some embodiments, the application player is also configured as an application broker, which interfaces with one or more application stores to download applications therefrom. An exemplary application broker is further disclosed in co-pending application Ser. No. 13/479,056, entitled "Application Broker," which is hereby incorporated by reference.

At a step 710, a command is received to execute the program that is specific to the guest operating system, from the host environment. In some embodiments, an icon associated with the guest operating system specific program is located on the desktop of the host operating system, as illustrated in FIG. 6A, or elsewhere of the host operating system such as within a folder within the host operating system. The user is able to activate the icon, which thereby generates the command to execute the program. The command can be generated in other ways, including through the installed programs list accessible on the host operating system.

As discussed elsewhere, the guest operating system specific program in the host operating system is a proxy program. Put differently, the guest operating system specific program, although only executable in the guest operating system, is post-processed to be appear just like a host operating system application.

At a step 715, the program is installed in the guest operating system. At a step 720, the program is executed within the guest operating system. After the step 720, the method 700 ends.

Figure 8:
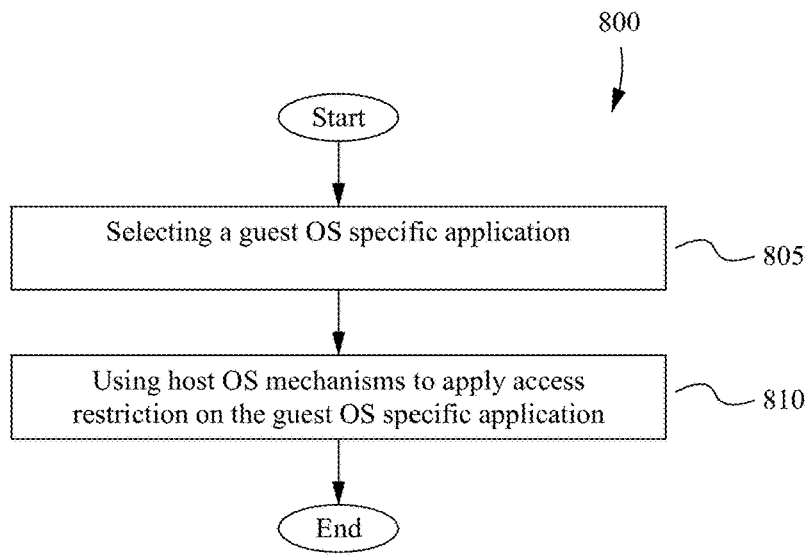
FIG. 8 illustrates an exemplary method of applying host operating system restrictions to a guest operating system specific application in accordance with the present invention.

FIG. 8 illustrates an exemplary method 800 of applying host operating system restrictions to a guest operating system specific application in accordance with the present invention. The method 800 begins at a step 805, where a guest operating system specific application is selected. The guest operating system specific program typically appears to the host operating system just like a host operating system application. At a step 810, host operating system mechanisms are used to apply access restrictions (e.g., policies and rules) on the guest operating system specific application. The policies and rules can be local or administered via a remote management console or machine. In some embodiments, the access restrictions are enforced when the guest operating system specific application is launched in the guest operating system. After the step 810, the method 800 ends.

In some embodiments, the guest operating system specific application is launched in an overlay in the host environment. For example, referring back to FIG. 6A, the overlay 615 is associated with the guest Android operating system. When Angry Birds Space is activated from the host Windows operating system, Angry Birds Space is launched in the overlay 615. Typically, the overlay 615 is configured to display a listing of any guest operating system specific applications. A guest operating system specific application can also be activated from the guest operating system (e.g., from the overlay 615).

The present invention allows end consumers to enjoy a full guest environment or just download a guest operating system specific application directly on a host environment to run in a guest environment. In both cases, the complexity is advantageously and completely masked from the end consumer. The switch between operating systems is transparent to the end user.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
   a. receiving a command from a first operating system to execute a program that is downloaded on the first operating system but associated with a second operating system;
   b. in response to receiving the command from the first operating system, launching an application player that is configured to run on the first operating system and to emulate the second operating system, and installing the program that is associated with the second operating system in the second operating system on the computing device; and
   c. after the program that is associated with the second operating system is installed in the second operating system, wherein installing the program associated with the second operating system comprises stripping wrapper code that is executable by the first operating system from said program, and installing the stripped program within the second operating system without the wrapper code, including the stripped program that is associated with the second operating system and that is installed in the second operating system on the computing device as part of an installed programs list of programs that are installed on said computing device, wherein the installed programs list is associated with the first operating system and includes one or more programs associated with the first operating system that are installed in the first operating system on the computing device, and executing the stripped program that is associated with the second operating system with the application player such that the stripped program runs as if the stripped program was running on the second operating system, wherein the method further comprises assigning a processor to the first operating system and another processor to the second operating system.

2. The non-transitory computer-readable medium of claim 1, wherein the computing device supports the first operating system and the second operating system.

3. The non-transitory computer-readable medium of claim 1, wherein the program is disguised as a first operating system specific application in the first operating system.

4. The non-transitory computer-readable medium of claim 1, wherein the method further comprises downloading and installing the application player associated with the second operating system on the computing device.

5. The non-transitory computer-readable medium of claim 1, wherein the method further comprises removing the program in the first operating system, thereby removing the program in the second operating system.

6. The non-transitory computer-readable medium of claim 1, wherein the method further comprises setting first operating system based policies on the program.

7. The non-transitory computer-readable medium of claim 1, wherein the method further comprises enforcing first operating system based policies on the program when the program is executing in the second operating system.

8. A computing device comprising:
   a. at least two operating systems stored in a memory, including a first operating system and a second operating system;
   b. an application player that is configured to run on the first operating system and emulate the second operating system such that the application player is able to run second operating system specific applications, wherein the second operating system specific applications are installed on the computing device in the second operating system and installing said second operating system specific applications in the second operating system comprises stripping wrapper code that is executable by the first operating system from said second operating system specific applications, and installing the stripped second operating system specific applications within the second operating system without said wrapper code, and wherein the stripped second operating system specific applications within the second operating system are included as part of an installed programs list of applications installed on said computing device, wherein the installed programs list is associated with the first operating system and includes one or more first operating system specific applications that are installed in the first operating system on the computing device;

c. a switching mechanism configured to switch between any of the at least two operating systems; and
  d. a first processor and a second processor, wherein the first processor is assigned to the first operating system and the second processor is assigned to the second operating system.

9. The computing device of claim 8, wherein the switching mechanism includes a hard key on the computing device.

10. The computing device of claim 8, wherein the switching mechanism includes a soft key.

11. The computing device of claim 8, wherein the switching mechanism is dependent on a plurality of configurations of the computing device.

12. The computing device of claim 8, wherein the computing device in a first configuration is predisposed to the first operating system, and the computing device in a second configuration is predisposed to the second operating system.

13. The computing device of claim 12, wherein the first configuration is when the computing device is docked to a docking station, and the second configuration is when the computing device is undocked from the docking station.

14. The computing device of claim 12, wherein the first configuration is when the computing device is rotated to a laptop form, and the second configuration is when the computing device is rotated to a tablet form.

15. The computing device of claim 12, wherein the first configuration is when a screen does not screen obscure a keyboard, and the second configuration is when the screen obscures the keyboard.

16. The computing device of claim 8, wherein the first operating system is a host operating system, and the second operating system is a guest operating system.

17. The computing device of claim 8, wherein the application player includes a broker platform that is configured to interface with and search a plurality of online application sources that is communicatively coupled with the computing device, and to provide a search result list of applications associated with the second operating system.

18. The computing device of claim 17, wherein the search result list is a refined list that excludes duplicate entries that represent the same application that is offered by two or more of the application sources.

* * * * *

UNITED STATES PATENT AND TRADEMARK OFFICE
CERTIFICATE OF CORRECTION

| | | |
|---|---|---|
| PATENT NO. | : 10,310,892 B1 | Page 1 of 1 |
| APPLICATION NO. | : 14/638709 | |
| DATED | : June 4, 2019 | |
| INVENTOR(S) | : Suman Saraf et al. | |

It is certified that error appears in the above-identified patent and that said Letters Patent is hereby corrected as shown below:

In the Specification

Column 1, Line 7, delete "13/479,056," and insert -- 13/479,086, --

Signed and Sealed this
Third Day of September, 2019

Andrei Iancu
*Director of the United States Patent and Trademark Office*